Patented Sept. 18, 1951

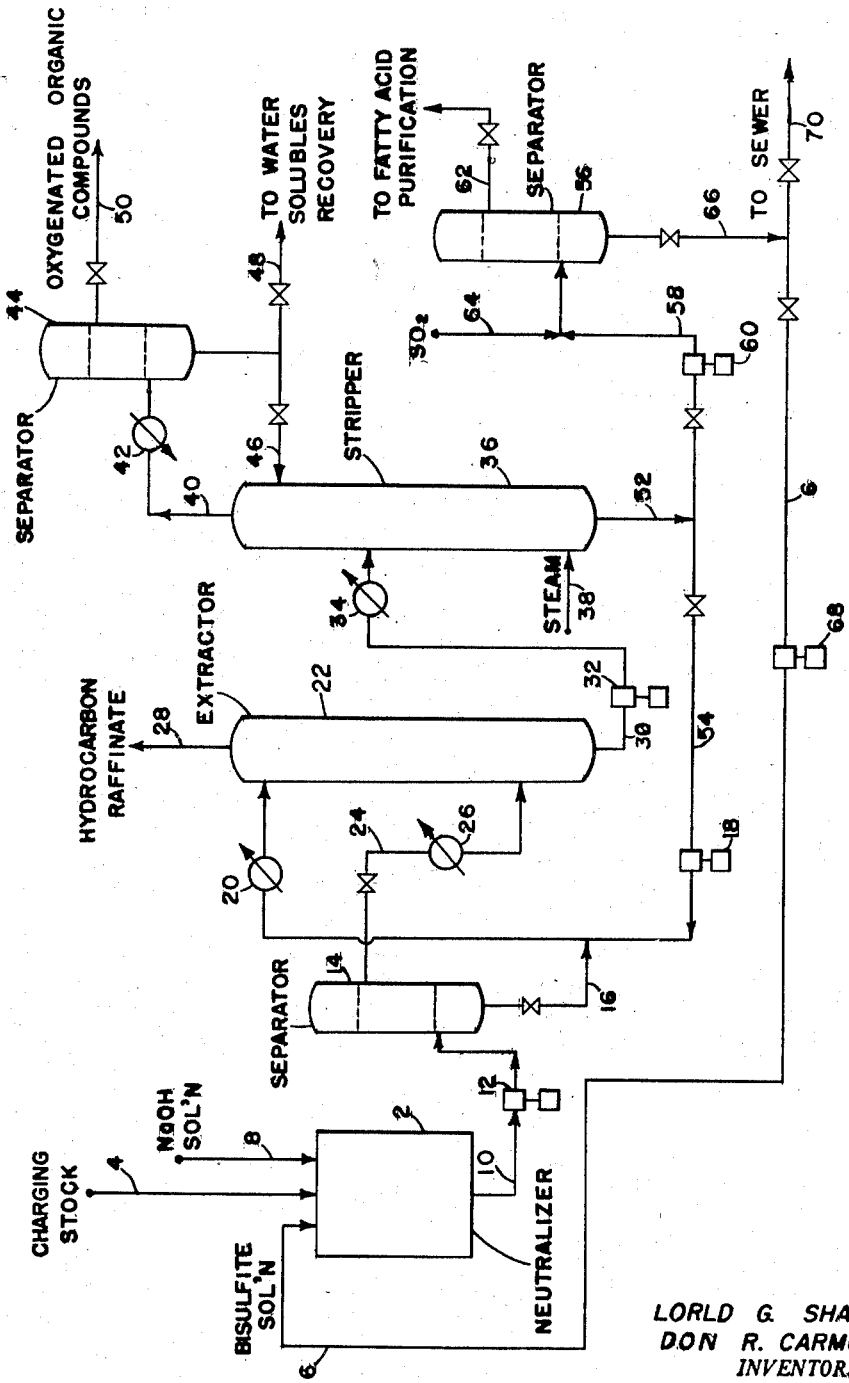

2,568,517

UNITED STATES PATENT OFFICE 2,568,517

EXTRACTION OF ORGANIC OXYGENATED COMPOUNDS FROM HYDROCARBON MIXTURES

Lorld G. Sharp and Don R. Carmody, Renner, Tex., assignors to Stanolind Oil and Gas Company, Tulsa, Okla., a corporation of Delaware Application June 4, 1949, Serial No. 97,288

16 Claims. (Cl. 260—450)

Our invention relates to a method for the separation of valuable oxygenated organic compounds from impure and complex mixtures containing the same. More particularly, it pertains to a process for recovering aldehydes, ketones, and alcohols in purified form from mixtures of one or more of these compounds containing undesirable impurities such as, for example, hydrocarbons.

It is known that aldehydes, ketones, and alcohols can be at least partially separated from hydrocarbon solutions thereof by extraction with a 10 to 50 per cent aqueous soap solution. The resulting extract generally contains about 65 mol per cent of the alcohols originally present in the hydrocarbon solution and about 32 per cent of the aldehydes and ketones together with approximately 38 per cent of the contaminating hydrocarbons. We are also aware of the fact that aqueous bisulfite solutions have been employed to remove aldehydes and ketones from hydrocarbon solutions thereof; however, it has been our observation that this procedure results only in the removal of about 20 per cent of the aldehydes and ketones present.

The process of our invention may be used generally for the separation of organic oxygenated compounds from hydrocarbon solutions thereof, from whatever source derived. Many methods for preparing such mixtures are described in the prior art. Some of the methods produce organic oxygenated compounds in relatively pure condition, or in admixture with impurities which may be separated by conventional means, as in the Oxo process, in which an organic compound containing an olefinic double bond is reacted with carbon monoxide and hydrogen to produce a mixture of aldehydes, alcohols, and unreacted charging stock. Other methods, however, such as the direct oxidation of hydrocarbon liquids and gases, tend to produce mixtures of organic oxygenated compounds and hydrocarbons which are extremely difficult to separate, owing to the heterogeneous nature and similarity of physical and chemical properties of the constituents thereof. Mixtures of similar complexity are produced by the hydrogenation of carbon monoxide by various processes, including the Fischer-Tropsch process, the original German synthol process, and the modern hydrocarbon-synthesis process employing fluidized hydrogenation catalysts.

Our process has been found to be particularly advantageous for processing the organic phase resulting from an embodiment of the fluidized-catalyst hydrocarbon-synthesis process (hereinafter referred to as the "HCS" process) in which a reduced, alkali-promoted iron catalyst is employed. Such a process, when operated under the conditions set forth below, produces an organic phase containing up to 30 per cent or more of organic oxygenated compounds, including aliphatic aldehydes, alcohols, ketones, and acids, and phenols:

Catalyst: Iron
Promoter: Potassium carbonate
Promoter concentration: 0.5–2.0 per cent by weight
Temperature: 550–650° F.
Pressure: 100–500 lb./in.$^2$, gage
Space velocity: 4–20 cu. ft. CO, measured at 60° F. and 1 atmosphere, per pound of iron per hour
CO concentration in feed: 10–20 per cent by volume
H$_2$:CO ratio in total feed: 1.5–6

The hydrocarbon constituents of the organic phase comprise virtually the entire range of saturated and unsaturated hydrocarbons, from methane to high-melting waxes. The organic oxygenated compounds are predominantly of the oil-soluble type, but a substantial proportion of the more water-soluble homologues are also present. The following organic oxygenated compounds, and others, have been shown to be present in such reaction products: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; methanol, ethanol, n-propyl alcohol, n-butyl alcohol, isobutyl alcohol, n-pentyl alcohol, n-octyl alcohol, and higher aliphatic alcohols; acetic acid, propionic acid, butyric acid, 2-methylbutyric acid, valeric acid, 2-methylhexanoic acid, caprylic acid, capric acid, myristic acid, palmitic acid, stearic acid, and other aliphatic carboxylic acids; esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols.

We have now discovered a method by which greatly increased quantities of certain of the aforesaid oxygenated organic compounds may be recovered from hydrocarbon solutions thereof. Specifically, we have found that by employing an aqueous extractant solution consisting essentially of fatty acid soaps (of the class hereinafter generally defined) and a water soluble bisulfite, a unitary result is achieved that greatly exceeds the aggregate results obtained by separately extracting a given hydrocarbon solution of these oxygenated compounds with soap and bisulfite solutions. Broadly, the process of our invention involves extracting a hydrocarbon solution of aldehydes, ketones, and alcohols with an aqueous solution of a bisulfite-fatty acid soap mixture in which the fatty acid soaps employed may be derived by neutralizing the crude fatty acids obtained in the HCS process, hereinafter referred to as "whole soaps." The resulting aqueous extract phase may then be treated in any convenient manner such as, for example, it may be subjected to steam distillation to recover the oxygenated organic compounds therefrom in greatly increased proportion to hydrocarbons. Further removal of contaminating hydrocarbons may be effected by subjecting the fraction of oxygenated organic compounds obtained in the steam distillation step to further extraction with a second solution of bisulfite and fatty acid soaps in which the latter are derived from acids having from 5 to 7 carbon atoms. We have observed that by employing a fatty acid soap mixture in which the fatty acids possess chain lengths of 5 to 7 carbon atoms, together with bisulfite, it is possible to recover oxygenated organic compounds of the above-mentioned type containing less than 5 per cent of hydrocarbon impurities. Alternatively, the crude hydrocarbon contaminated solution of oxygenated organic compounds may be initially extracted with an aqueous mixture of whole soaps prepared, if desired, by neutralizing the crude mixture of fatty acids found in the oil stream produced by the HCS process. Extraction of the crude product mixture in this manner serves to recover in the extract phase substantially all of the oxygenated organic compounds including those of relatively high molecular weight. The latter, together with the remainder of the organic oxygenated compounds present in the extract phase, thus obtained, may then be recovered substantially free from contaminating hydrocarbons, i. e., less than 5 per cent, by separating the dissolved chemicals and hydrocarbons from the first extract phase by means of steam distillation and thereafter re-extracting the separated chemicals and hydrocarbon fraction with an aqueous solution of a bisulfite and soaps of fatty acids having a chain length of from 5 to 7 carbon atoms.

The temperature at which the extraction step with the bisulfite-fatty acid soap mixture is effected may vary. We have found generally, however, that satisfactory results are obtained while operating in the temperature range of from about 25 to about 50° C. and particularly in the range of from 37 to 43° C. The concentration of fatty acid soaps employed in accordance with our invention may likewise vary and in the majority of instances we have found from about 20 to 40 weight per cent of fatty acid soaps to be satisfactory, although concentrations of from about 20 to 25 weight per cent of the soaps are generally preferable.

The pH of the extractant solution should be maintained in the range of from about 6.7 to about 9.0, preferably from about 6.8 to about 7.3. Although the preliminary extraction step may be effected with solutions having a pH outside the aforesaid range, we have found that adjustment of the pH of the fatty acid soap-bisulfite solution is highly desirable in order to prevent the bisulfite from decomposing on steam distillation.

The relative proportion of extractant solution to the volume of crude hydrocarbon mixture to be extracted may vary. Equal volumes of extractant solution and crude hydrocarbon mixture may be employed if desired; however, in general, oil to extractant ratios of from 4:1 to 10:1 are satisfactory. In this connection, it is ordinarily preferable to employ bisulfite concentrations and volume ratios of the oil to extractant such that there is a molar excess of bisulfite over the extractable carbonyl compounds to ensure maximum efficiency of extraction of the oxygenated chemicals. While, as previously indicated, it is generally desirable to obtain the fatty acid soaps by neutralizing the crude acid mixture found in the oil stream produced by the HCS process referred to above, it will be readily apparent that the soap mixtures employed need not be derived from this source, nor is it necessary that the soap composition be the same. In preparing the extractant solution it is frequently desirable to employ whole soaps owing to the convenience and economy of operation in the utilization thereof. The composition of the acid fraction found in the oil stream from which these whole soaps are derived is generally as follows:

| Acid | Vol. Per Cent |
|---|---|
| Propionic | 0.8 |
| Butanoic | 6.1 |
| Pentanoic | 16.5 |
| Hexanoic | 17.6 |
| Heptanoic | 18.5 |
| Octanoic | 11.7 |
| Nonanoic and higher | 28.8 |

For recovering the alcohols and carbonyl compounds from the majority of crude chemical mixtures encountered, however, we have found it preferable to effect the initial extraction step with a soap solution prepared from an acid fraction in which the average molecular weight of the fatty acids may vary from 102 to 116 ($C_5$ to $C_6$ acids), for example, 106 to 109, i. e., $C_{5.3}$ to $C_{5.5}$ fatty acids. We have further found that by employing an acid fraction of this type, under conditions hereinafter specifically referred to, that superior recovery of both alcohols and carbonyls can be achieved, while at the same time effecting a substantial reduction in the concentration of contaminating hydrocarbon extracted with the alcohols and carbonyl compounds. Likewise the narrow range of fatty acid salts, previously referred to and which may be used to further remove contaminating hydrocarbons from a mixture of aldehydes, ketones, and alcohols, may also vary. A representative fraction of fatty acid salts in the $C_5$ to $C_7$ range which may be employed in this particular step has a composition generally as follows:

39.3 per cent $C_5$ acids
38.1 per cent $C_6$ acids
22.6 per cent $C_7$ acids

It will be recognized, however, that the concentration of each of these acids may be varied from at least 5 to 10 per cent without adversely affecting the final results.

The amount of bisulfite employed likewise may vary rather widely and, in general, it may be said that concentrations of from 2 to 5 weight per cent up to the quantity required to saturate the particular soap solution utilized, with respect to bisulfite, will give satisfactory results. When employing a mixture of whole soaps, the bisulfite concentration may range from about 2 to 20 weight per cent and preferably from about 5 to 15 weight per cent. With fatty acid soaps of from 5 to 7 carbon atoms, bisulfite concentrations of from about 5 to about 7.5 weight per cent are generally preferred. In general, however, it may be said that extractant solutions which are saturated with respect to bisulfite are preferable.

A preferred embodiment of our invention consists essentially of first completely neutralizing the free fatty acids in the water-washed oil fraction obtained from the HCS process and thereafter introducing sufficient sulfur dioxide into the mixture to produce the water soluble bisulfite in the desired concentration. Sufficient base is then added to bring the pH of the mixture to a value in the range of from about 6.8 to about 7.3.

The accompanying drawing is a diagrammatical representation of an arrangement of apparatus adapted to carry out this particular embodiment of our invention. Referring to the drawing, a charging stock consisting of waterwashed oil from the HCS process is introduced into neutralizer 2 through line 4. The quantities of bisulfite introduced through line 6 and caustic (or other suitable base) introduced through line 8 are such that the resulting aqueous solution will contain from about 20 to 40 per cent by weight of sodium soaps and give a solution having a pH of between about 6.8 and about 7.3. After the desired pH is obtained, the resulting mixture is withdrawn through line 10 and fed by pump 12 into separator 14 where the aqueous and oil phases separate. The aqueous phase is then withdrawn through valved line 16 and combined with the recycle bisulfite-soap solution in line 54 where it is transferred by pump 18 through heater 20 into extractor 22. The oil phase from separator 14 is fed into the bottom of extractor 22 by valved line 24 through heater 26. The hydrocarbon raffinate is withdrawn from extractor 22 through line 28 and sent to the gasoline refining plant. The enriched soap phase is withdrawn through line 30 and fed by pump 32 through heater 34 into stripper 36 into which steam is introduced through line 38. The steam distillate thus obtained is withdrawn through line 40, into condenser 42 and then transferred into separator 44. The aqueous phase is partially recycled through valved line 46 and partially withdrawn through valved line 48 to water solubles recovery. The oil layer containing the organic oxygenated compounds in concentrated form is withdrawn from separator 44 through valved line 50. The lean extractant solution is withdrawn from the stripper through line 52 and is fed into extractor 22 by pump 18 through valved line 54 and heater 20. Alternatively, the lean extractant solution may be sent, if desired, to separator 56 through valved line 58 by pump 60 where the fatty acids may be drawn off through line 58 to valved line 62 after sufficient sulfur dioxide has been introduced through line 64 to liberate the fatty acids from their sodium salts. Simultaneously sodium bisulfite is produced in separator 56 and may be withdrawn through valved line 66 and recycled through valved line 6 by pump 68 to the neutralizer and used in conjunction with the soap solution for the next extraction. Excess bisulfite solution may be withdrawn through valved lines 66 and 70. It will be recognized that the foregoing procedure furnishes a convenient method for the recovery of fatty acids produced in the HCS process and simultaneously produces a necessary reagent for improved recovery of the alcohol and carbonyl fractions.

The process of our invention may be further illustrated by the following specific examples:

EXAMPLE 1

Equal volumes of a water-washed acid-free oil from the HCS process were extracted with solutions having the composition indicated below. The extractions were carried out at 37° C. and an oil to extractant solution ratio of 4:1 was employed. Ten extractions each were made with soap solutions alone and with soap plus bisulfite, while the results obtained with bisulfite alone were based on four separate extractions. All values are expressed in terms of the per cent of alcohols and carbonyl compounds recovered from the extract phase, based on the concentrations thereof in the original oil sample. In all cases whole soaps were employed in the extractant solutions.

Table I

|  | Combination of 20 Weight Per Cent Sodium Soaps Plus 11 Weight Per Cent Sodium Bisulfite (pH=6.8) | 11 Weight Per Cent Sodium Bisulfite Solution Extraction Prior to Soap Extractions | 11 Weight Per Cent Sodium Bisulfite Solution Extractions After Soap Extractions | 20 Weight Per Cent Soap Solution |
|---|---|---|---|---|
| Mole Per Cent Removal of Alcohols | 73 | 24 | 3.4[1] | 63 |
| Mole Per Cent Removal of Carbonyls | 53 | 19 | 12.5[1] | 30 |
| Volumn Per Cent Hydrocarbons in Extract | 37 | −5 | 9.0 | 35 |

[1] Based on the original oil.

From the results shown in the above table it will be seen that a very substantial improvement in carbonyl recovery is achieved over that obtained by the separate use of soap or bisulfite solutions. Also, an accompanying improvement is obtained in efficiency in the extraction of alcohols thus resulting in the procurement of aldehydes, ketones, and alcohols in increased ratio to contaminating hydrocarbons.

EXAMPLE II

Two volumes of synthetic, acid-free oil of four liters each were subject to extraction with solutions having the composition indicated below. The extractions were effected at 38° C. employing an oil to soap solution volume ratio of 4:1. Ten extractions each were made with soap solutions alone and with solutions containing soap and bisulfite. The mol percentage removal of carbonyls from the original oil was calculated from the carbonyl content of the combined resulting extracts, while the mol percentage removal of alcohols was based on the difference in alcohol content of the oil before and after extraction was effected. The initial pH of the extractant solution, with the exception of the last four extractions, was adjusted with pentanoic acid to a value of 6.8.

*Table II*

|  | 25 Wt. Per Cent Sodium Soaps of Fatty Acid Mixture Averaging 5.3 Carbon Atoms | 24 Wt. Per Cent Sodium Soaps of Fatty Acid Mixture Averaging 5.3 Carbon Atoms Plus 7.4 Wt. Per Cent Sodium Bisulfite | 40 Wt. Per Cent Sodium Soaps of Fatty Acid Mixture Averaging 5.3 Carbon Atoms |
|---|---|---|---|
| Volume of Extract, ml. | 122 | 536 | 491 |
| Mol Per Cent Removal of Alcohols | 31.6 | 75.4 | 67.0 |
| Mol Per Cent Removal of Carbonyls | 11.8 | 35.0 | 41.1 |
| Volume Per Cent Hydrocarbons in Extract | 8.5 | 14.0 | 36.8 |

From an inspection of the data appearing in the table immediately above, the marked difference in extractive power of the two types of solutions becomes very apparent. Moreover, these data indicate that the improvement in extractive power of the soap-bisulfite solution is not entirely due to carbonyl removal by formation of the bisulfite addition product. Furthermore, the difference in extractive power of the two solutions can not be explained on the basis of concentration of active ingredients alone because the soap-bisulfite solution is much more selective for chemicals than is a stronger soap solution having equal solubilizing powers, based on volume, alone. Thus, from the above data it will be seen that the soap-bisulfite solution removed a greater volume of oil (536 ml. compared to 491 ml.) at a much lower hydrocarbon content (14 vol. per cent compared to 36.8 vol. per cent) than did a 40 weight per cent $C_{5.3}$ soap solution.

As previously indicated, the soaps employed in carrying out our proces may consist essentially of those mixtures produced by neutralizing the free fatty acids found in the crude hydrocarbon mixture thereof as produced by the HCS process. In this connection, it will be recognized that the term "soap" is not employed in the present disclosure and appended claims in accordance with its normally accepted meaning; but, on the contrary, such expression is intended to include the salts of the various lower fatty acids such as, for example, those having chain lengths of 5 to 7 carbon atoms. It will be further apparent to those skilled in the art that other carboxylic acids may be substituted in the process of our invention for the fatty acids herein referred to. As examples of additional carboxylic acids there may be mentioned: acrylic acid, crotonic acid, malonic acid, adipic acid, maleic acid, fumaric acid, benzoic acid, and the like. While the soaps utilized herein have been limited in the foregoing disclosure to the fatty acid salts of sodium it will be appreciated that the alkali metal salts, in general, as well as the ammonium and substituted ammonium derivatives may likewise be suitable. The corresponding bisulfites formed by introducing sulfur dioxide into aqueous solutions of the foregoing bases will also be found suitable in carrying out the process of our invention.

While we have illustrated our invention by certain specific applications, we do not wish to limit ourselves to such specific cases since, as previously indicated, our invention is applicable to the recovery of aldehydes, ketones, and alcohols in purified form from hydrocarbon or other solutions thereof. It will likewise be obvious to those skilled in the art that numerous modifications exist in the procedure employed for carrying out our invention. Thus, in the initial step of adjusting the pH of the extractant solution to the desired value, the charging stock introduced through line 4 may be split and a portion of the acid-containing feed introduced into extractor 22 to control the pH. Alternatively, some impure fatty acids from separator 56 may be recycled via line 54 to extractor 22 to maintain the pH of the extractant solution within the desired range. Such modifications or any equivalent thereof that would normally occur to those skilled in the art are to be considered as entirely within the scope of our invention.

We claim:

1. In a process for the recovery of organic oxygenated compounds selected from the group consisting of alcohols, aldehydes, and ketones from a hydrocarbon solution thereof, the steps which comprise contacting said solution with an aqueous extractant solution of a bisulfite compound and a mixture of fatty acid soaps, said extractant solution having a pH of from about 6.7 to about 9.0, and thereafter withdrawing the aqueous extract phase containing at least one of the aforesaid compounds in increased ratio to hydrocarbon.

2. The process of claim 1 in which fatty acid soaps having from 5 to 6 carbon atoms are employed.

3. In a process for the recovery of oxygenated organic compounds selected from the group consisting of alcohols, aldehydes, and ketones from a hydrocarbon solution thereof, the steps which comprise contacting said solution with an aqueous extractant solution of a bisulfite compound and fatty acid soaps having from 5 to 6 carbon atoms for a time sufficient to allow a major portion of at least one of said oxygenated organic compounds to pass into said extractant solution, said extractant solution having a pH of from about 6.7 to about 9.0, and thereafter withdrawing the resulting aqueous extract phase.

4. In a process for the recovery of organic oxygenated compounds selected from the group consisting of alcohols, aldehydes, and ketones from a hydrocarbon solution thereof, the steps which comprise countercurrently contacting said solution with an aqueous fatty acid soap mixture, withdrawing the aqueous extract phase containing the alcohols, aldehydes, and ketones, separating said organic oxygenated compounds from said aqueous extract phase, thereafter contacting said separated compounds with a second aqueous extractant solution of a bisulfite compound and a mixture of fatty acid soaps in which the latter consists essentially of soaps derived from $C_5$ to $C_7$ acids, and thereafter withdrawing the aqueous extract phase containing at least one of the aforesaid compounds in increased ratio to hydrocarbon.

5. In a process for the recovery of organic oxygenated compounds selected from the group consisting of alcohols, aldehydes, and ketones from a hydrocarbon solution thereof, the steps which comprise contacting said solution with an aqueous extractant solution containing from about 5 to 15 weight per cent of a water-soluble bisulfite compound and from about 20 to about 25 weight per cent of a mixture of whole soaps, and thereafter withdrawing the aqueous extract phase containing at least one of the aforesaid compounds in increased ratio to hydrocarbon.

6. In a process for the recovery of organic oxygenated compounds selected from the group consisting of alcohols, aldehydes, and ketones from a hydrocarbon solution thereof, the steps which comprise contacting said solution with an aqueous extractant solution containing a bisulfite compound in a concentration of from about 2 to 5 weight per cent up to a concentration at which said solution is saturated with respect to bisulfite and from about 20 to 40 weight per cent of a mixture of water-soluble soaps, withdrawing the aqueous extract phase containing said oxygenated compounds in increased ratio to hydrocarbon, separating from said aqueous extract phase a fraction containing said oxygenated compounds, and thereafter subjecting said fraction to further extraction with an aqueous extractant solution of a bisulfite and a mixture of fatty acid soaps in which the latter consists essentially of soaps derived from $C_5$ to $C_7$ acids.

7. In a process for the recovery of organic oxygenated compounds selected from the group consisting of alcohols, aldehydes, and ketones from a hydrocarbon solution thereof, the steps which comprise contacting said solution with an aqueous extractant solution of a bisulfite compound and fatty acid soaps, said solution having a pH of from about 6.8 to about 7.3, withdrawing the aqueous extract phase containing the alcohols, ketones, and aldehydes, in increased ratio to hydrocarbon, thereafter subjecting said extract phase to steam distillation to obtain a distillate having an oil layer in which at least one of the aforesaid compounds is present in substantially increased ratio to hydrocarbon, separating said oil layer, and extracting the latter with an aqueous extractant solution of a bisulfite compound and a mixture of fatty acid soaps consisting essentially of soaps derived from $C_5$ to $C_7$ acids.

8. In a process for recovering organic oxygenated compounds selected from the group consisting of alcohols, aldehydes, and ketones from a hydrocarbon solution thereof, the steps which comprise contacting said solution with an aqueous extractant solution containing a bisulfite compound in a concentration of from about 2 to 5 weight per cent up to a concentration at which said solution is saturated with respect to bisulfite and from about 20 to 40 weight per cent of a mixture of water-soluble soaps, said solution having a pH of from about 6.8 to about 7.3, withdrawing the aqueous extract phase containing the alcohols, aldehydes, and ketones in increased ratio to hydrocarbon, thereafter separating from said extract phase an oil layer fraction in which at least one of the foresaid compounds is present in substantially increased ratio to hydrocarbon, and extracting said oil layer fraction with an aqueous extractant solution containing a bisulfite compound in a concentration of from about 2 to 5 weight per cent up to a concentration at which said solution is saturated with respect to bisulfite and from about 20 to 25 weight per cent of a mixture of fatty acid soaps consisting essentially of soaps derived from $C_5$ to $C_7$ acids.

9. In a process for the recovery of organic oxygenated compounds selected from the group consisting of alcohols, aldehydes, and ketones from a hydrocarbon solution thereof, the steps which comprise countercurrently contacting said solution with an aqueous extractant solution of a bisulfite compound selected from the group consisting of ammonium and alkali metal bisulfite compounds and a mixture of fatty acid soaps, said extractant solution having a pH of between about 6.7 to about 9.0, subjecting the resultant extract phase to steam distillation to give a lean extractant solution as a residue and a distillate having an oil layer containing at least one of the aforesaid compounds in increased ratio to hydrocarbon, and introducing sulfur dioxide into said lean extractant solution to simultaneously liberate fatty acids and to produce a water-soluble bisulfite compound.

10. The process of claim 1 in which the extractant solution consists essentially of an alkali metal bisulfite and a mixture of fatty acid alkali metal soaps.

11. The process of claim 1 in which the extractant solution consists essentially of sodium bisulfite and a mixture of fatty acid sodium soaps.

12. The process of claim 6 in which both extractant solutions employed consist essentially of an alkali metal bisulfite and a mixture of fatty acid alkali metal soaps.

13. The process of claim 6 in which both extractant solutions employed consist essentially of sodium bisulfite and a mixture of a fatty acid sodium soaps.

14. In a process for the recovery of organic oxygenated compounds selected from the group consisting of alcohols, aldehydes, and ketones from a hydrocarbon solution thereof, the steps which comprise contacting said hydrocarbon solution with an aqueous extractant solution including a bisulfite compound in a concentration of from about 2 to 5 weight per cent up to a concentration at which said solution is saturated with respect to said bisulfite compound from about 20 to 25 weight per cent of a mixture of water soluble soaps derived from $C_5$ to $C_7$ acids and sufficient free organic acid to produce a solution having a pH of from about 6.8 to about 7.3, thereafter recovering an aqueous extract phase containing at least one of the said oxygenated organic compounds in substantially increased ratio to hydrocarbon, separating the former from said aqueous extract phase, liberating fatty acids from the soaps in at least a part of said aqueous extract phase, and recycling a portion of said liberated fatty acids to said contacting step.

15. In a process for the recovery of oxygenated organic compounds selected from a group consisting of alcohols, aldehydes and ketones from a hydrocarobn solution thereof, the steps which comprise countercurrently contacting said solution with an aqueous extractant solution of an alkali metal bisulfite compound and a mixture of fatty acid alkali metal soaps, said extractant solution having a pH of between about 6.7 and about 9.0, subjecting the resultant extract phase to steam distillation to give a lean extractant solution as a residue and a distillate having an oil layer containing at least one of the aforesaid compounds in increased ratio to hydrocarbon, and introducing sulfur dioxide into said lean extractant solution to simultaneously liberate fatty acids and produce a water-soluble bisulfite compound.

16. In a process for the recovery of oxygenated organic compounds selected from a group consisting of alcohols, aldehydes and ketones from a hydrocarbon solution thereof, the steps which comprise countercurrently contacting said solution with an aqueous extractant solution of sodium bisulfite and a mixture of fatty acid sodium soaps, said extractant solution having a pH of between about 6.7 and about 9.0, subjecting the resultant extract phase to steam distillation to give a lean extractant solution as a residue and a distillate having an oil layer containing at least one of the aforesaid compounds in increased ratio to hydrocarbon, and introducing sulfur dioxide into said lean extractant solution to simultaneously liberate fatty acids and to produce sodium bisulfite.

LORLD G. SHARP.
DON R. CARMODY.

REFERENCES CITED

The following references are of record in the file of this patent:

UNITED STATES PATENTS

| Number | Name | Date |
|---|---|---|
| 1,838,032 | Wiezevich et al. | Dec. 22, 1931 |
| 2,274,750 | Soenksen et al. | Mar. 3, 1942 |
| 2,457,257 | Michael et al. | Dec. 28, 1948 |
| 2,470,782 | McGrath et al. | May 24, 1949 |

FOREIGN PATENTS

| Number | Country | Date |
|---|---|---|
| 259,293 | Great Britain | Oct. 6, 1926 |
| 497,170 | Great Britain | Dec. 14, 1938 |